May 6, 1969 R. E. COOK 3,442,555
METHOD OF MAKING A ROTARY BRUSH
Filed Sept. 29, 1967
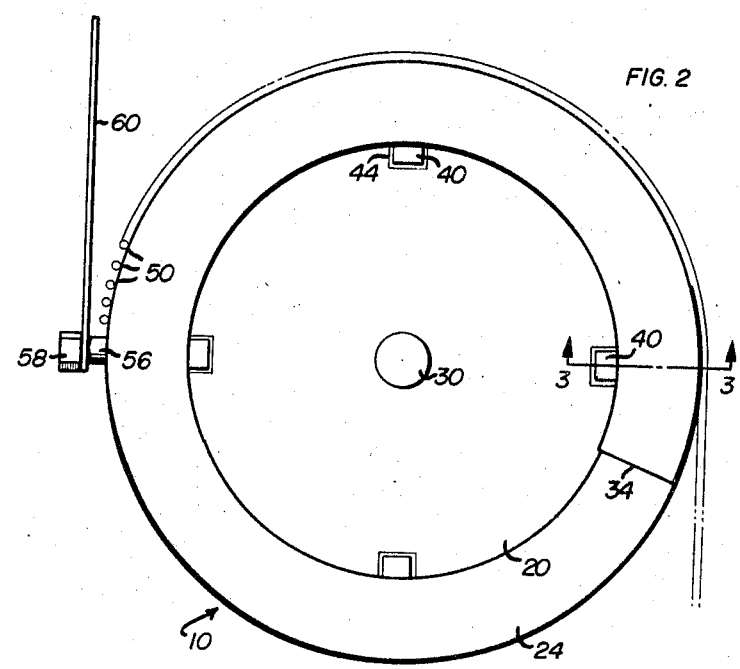
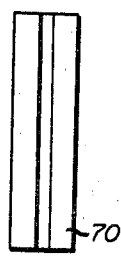
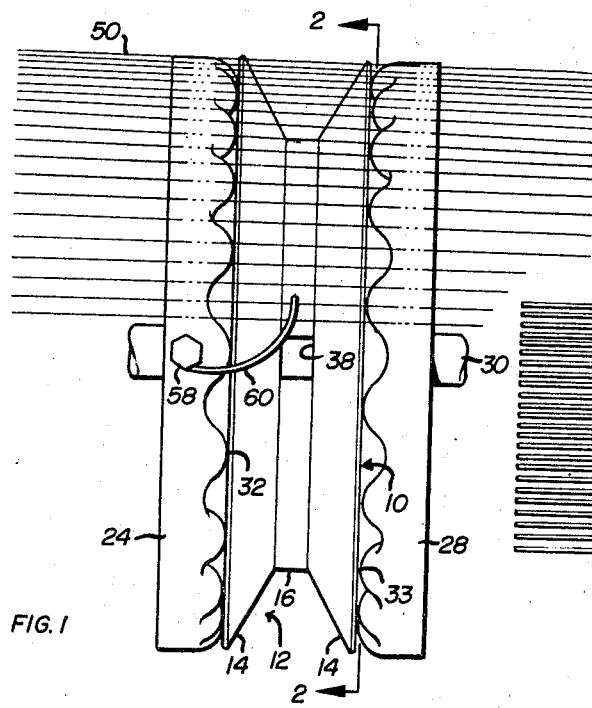
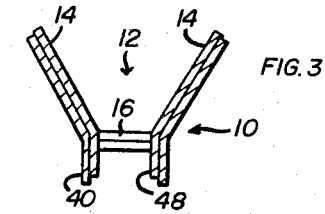
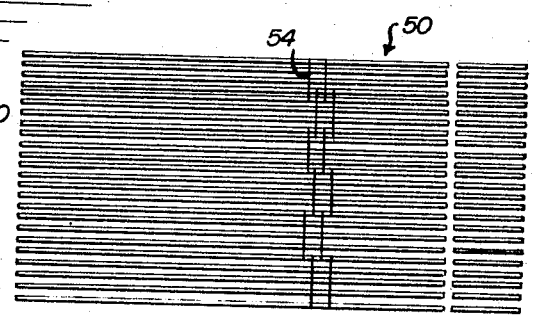
INVENTOR.
ROBERT E. COOK.
BY
WILSON, SETTLE & BATCHELDER.
ATT'YS.

INVENTOR.
ROBERT E. COOK.
BY
WILSON, SETTLE & BATCHELDER.
ATT'YS.

United States Patent Office 3,442,555
Patented May 6, 1969

3,442,555
METHOD OF MAKING A ROTARY BRUSH
Robert E. Cook, Pinckney, Mich., assignor to Jenkins Equipment Company, Inc., Dexter, Mich., a corporation of Michigan
Filed Sept. 29, 1967, Ser. No. 671,782
Int. Cl. A46b 1/00, 9/00
U.S. Cl. 300—21                   6 Claims

ABSTRACT OF THE DISCLOSURE

The method of making a brush including the steps of placing brush elements transversely across a ring having a V-shaped groove, forcing said brush elements into the base of said groove by winding a plurality of turns of wire around the brush elements, locking the ends of the wire with an elongated clip, and crimping the clip into the shape of an S to securely hold the brush elements in position through all positions of operation.

---

The invention relates to a method of making rotary brushes and more particularly to the method of making brushes for sweeper machines.

In accordance with my invention I provide a method of making a rotary brush with a new and improved locking arrangement for holding brush elements such as monofilaments in a brush wheel in a new manner to produce an improved rotary brush. The invention includes a brush wheel which is formed with a groove to receive monofilaments in the groove with the groove being formed about the periphery of the wheel in any shape and if desired in a sinuous path. In a making the rotary brush the monofilaments or brush elements are placed transversely across the groove and rotation of the wheel simultaneously forces the brush elements into the groove by a wire and then the locking of the ends of the wire takes place by a clip, for example, an elongated clip. The clip is crimped to lock the wire to hold the brush elements in the lower part of the groove and then the clip is crimped again to further lock the ends of the wire by forming the shape of an S either before engagement of the side walls of the wheel to form the groove into a sinuous path or the clip is formed in the shape of an S upon engagement of the side walls to indent portions of the opposite side walls to form a sinuous path in which the clip conforms to the shape of the path and brush elements are additionally locked in the path between and by the side walls of the wheel to form the groove into a path securely hold the brush elements in position through all conditions of operation. The brush elements are formed by linearly oriented polypropylene or any other material which brushes are made of such for example wire or fiber.

It is therefore an object of my invention to provide a method of making a rotary brush of improved elements and locking arrangements therefor.

Another object of my invention is to provide a new and improved method of making a rotary brush.

Other objects of this invention will appear in the following description and appended claims, reference being had to the accompanying drawings forming a part of this specification wherein like reference characters designate corresponding parts in the several views.

In the drawings:

FIGURE 1 is a view in elevation of a brush wheel held in position for rotation by a pair of rotary jaws and embodying features of my invention;

FIGURE 2 is a view taken in the direction of the arrows and along the line 2—2 of FIGURE 1;

FIGURE 3 is a view taken in the direction of the arrows and along the line 3—3 of FIGURE 2;

FIGURE 4 is a view of the monofilaments secured in sheet form;

FIGURES 5 and 6 are views of an elongated locking clip embodying features of my invention;

Figure 10:
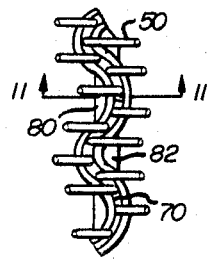
FIGURE 10 is a view in elevation of a portion of the completed rotary brush.
Figure 12:
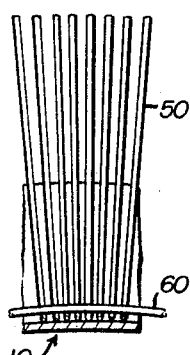
Figure 11:
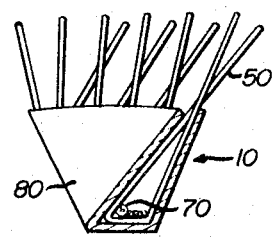

FIGURE 11 is a view taken in the direction of the arrows along the line 11—11 of FIGURE 10; and FIGURE 12 is a fragmentary side view showing the monofilaments locked in position at the lower part of the groove in the brush wheel and showing how the monofilaments on one side of the grooves are moved to engage those on the other side of the groove between the outer edges thereof with the ends of the monofilaments fanning out to be spaced from each other as shown in FIGURE 10.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings the numeral 10 designates in general a brush wheel or ring which is made of any suitable metal such as stainless steel and is formed with a brush receiving groove 12 between V-shaped walls 14 which are connected at their lower ends by a horizontal portion 16. The brush wheel 10 is mounted on a hub 20 of a jaw or anvil 24 and between the jaw 24 and a jaw or anvil 28 for rotation with the jaws which are mounted on a shaft 30 for rotation and are slidable on the shaft toward each other to crimp the wheel 10. If desired, only one of the jaws may be slidable and the other fixed as movement of one jaw toward the other will perform the crimping operation. The wheel 10 is formed as shown in one piece with one end overlapping the other end as at 34. The horizontal portion 16 of the wheel 10 is pierced at 38 forming inwardly four lugs 40 which extend in grooves 44 on the hub 20 to cause rotation of the wheel upon rotation of shaft 30 and jaws 24 and 28. The lugs 40 are used for attachment of the finished brush to a sweeper machine. As will be noted in FIGURE 3 the ends of the wheel are overlapped and both ends are pierced with the inner end forming one of the four lugs 40 and the outer end forming an inwardly directed lug 48 within the lug 40 so as to lock the ends of the wheel together.

The brush elements 50 are monofilaments and are formed of linearly oriented polypropylene or other suitable material with each strand being slightly corrugated if desired for strength. If desired, the other materials such as wire or fiber may be used. The monofilaments are as shown in FIGURE 4 and coupled together as shown at 54.

Figure 7:
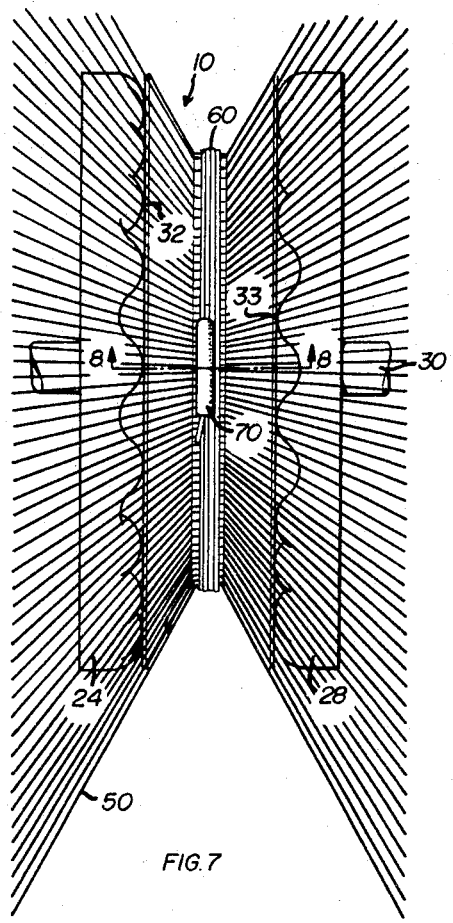
FIGURE 7 is a view of the wheel and jaws shown in FIGURE 1 with the monofilaments locked in the groove of the wheel by the elongated locking clip and wire.
Figure 9:
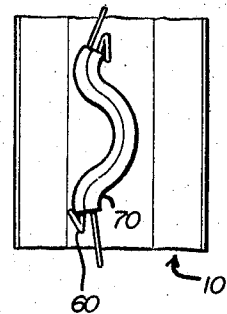
FIGURE 9 is a fragmentary view of a modified form as shown in FIGURE 7 with the elongated clip crimped to form the shape of an S.
Figure 8:
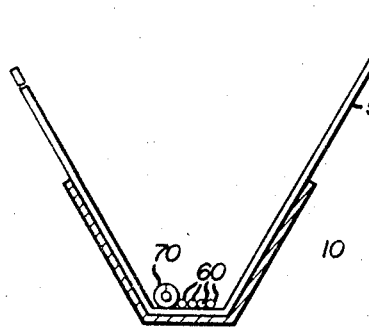
FIGURE 8 is a view taken in the direction of the arrows along the line 8—8 of FIGURE 7.

The jaw 24 carries a stud 56 and a lock screw 58 for clamping the end of a wire 60 which wire is used to force the monofilaments 50 into the groove 12 of the wheel 10 upon rotation of the wheel. As shown in FIGURES 1 and 2 the monofilaments 50 are placed transversely across the groove 12 and the wire 60 extends upwardly and is held under tension by any suitable device (not shown)

when the wheel 10 is being rotated in a counterclockwise direction. When the wheel 10 is rotated the monofilaments are moved around with the wheel 10, the wire is drawn by the stud 56 so that when the stud moves in a counterclockwise direction with the wheel it will move the end of the wire from a vertical plane causing it to move into the groove 12 forcing the central portions of the monofilaments ahead of it into the groove. When the wheel 10 has made one complete revolution, the wire 60 completely encircles the monofilaments and holds the central portions thereof in the groove 12 against the horizontal portion 16. At this time the monofilaments 50 are formed as shown in FIGURES 7 and 8 with the ends thereof on angles conforming to the angles of the wheel sides 14 and the ends thereof spaced apart. The next step is to rapidly rotate the wheel 10 from two to ten more times to cause the wire 60 to encircle the wheel 10 in the groove 12 and on the monofilaments to hold these brush elements in position and then an elongated C-shaped aluminum or other material clip 70 is placed around the last strand of wire which was moved into the groove 12 and also around the end of the wire severed from the stud 56 and the clip 70 is crimped to close the C and lock the wire ends in position in groove 12 to lock the monofilaments as shown in FIGURES 7 and 8. The ends of the wires when severed may be bent back upon opposite ends of the clip 70. If desired the clip 70 may be crimped at this time as shown in FIGURE 9 to form it into the shape of an S so that it will conform to the shape of the groove 12 after it is formed by the jaws 24 and 28. Also if desired the jaws 24 and 28 may be moved together to indent portions of the side walls 14 with the clip being as shown in FIGURE 7. When the jaws are moved to indent the side walls 14 the groove is formed in a sinuous path and the clip 70 is formed into the shape of an S to conform to the shape of the sinuous path as shown in the completed brush in FIGURE 10. Thus, the clip 70 is crimped from C-shape to hold the ends of the wire 60 and then the clip 70 is formed into a shape of an S to further lock the ends of the wire 60 and the wire loops lock the monofilaments in the lower part of the groove 12. When the jaws 24 and 28 indent portions of the side walls as at 80 and 82 by convolutions 32 and 33, it results in the groove 12 forming a sinuous path as shown in the completed brush of which a portion only is shown in FIGURE 10. This causes the monofilaments to be engaged by the side walls 14 and be locked in the groove thereby in the position shown in FIGURES 11 and 12. Because the monofilaments are round in cross section the parts thereof on each wall do not engage each other at their outer edges in parallel relation when the wheel is being indented, but the parts on one wall will move toward the parts on the other wall tending to go between two of the parts to thus cause the ends of the monofilaments to fan out on an angle to each other as shown in FIGURES 10 and 12. Thus, the ends of the monofilaments are spaced apart as shown in the completed brush and are arranged in the sinuous path to provide a sinuously formed brush. Thus the brush elements 50 are locked in the brush wheel by the loops of wire 60 and also clamped between the side walls 14 to clamp the inner ends of the brush elements fairly in position to perform the work required of the brush.

By winding the wire 60 about the wheel under great pressure and crimping the sides of the C-shaped clip to close same, will hold the ends of the wire in place, however the clip is further crimped into the shape of an S or other shape to further hold the ends of the wires against coming loose. The ends of the wires are then reversely bent back on the clip so they are further locked as shown in FIGURE 9 as the ends would have to become straight before being drawn through the clip 70.

By the present method most any assembler may apply the clip and see that it is crimped to secure the brush elements in position.

I claim:

1. A method of making a brush which comprises attaching a free end of a continuous supply of wire to a peripheral surface of one leg of a substantially V-shaped ring, interposing brush elements transversely of said V-shaped ring and between the peripheral surface of said ring and said wire, producing relative movement between said wire and said ring while tensioning said wire to force the medial portions of said brush elements into the base of said V-shaped ring, winding a plurality of consecutive turns of wire on the medial portions of said brush elements, surrounding the wire adjacent the end of the last turn with an elongated C-shaped clip, detaching said free end of the wire and locating a portion adjacent said end in the C-shaped clip while maintaining tension on said wire, deforming said clip to crimp the walls of said clip and operatively connect the free end of the wire to the last turn on said ring, and severing the wire from the continuous supply.

2. A method as defined in claim 1, including the further step of deforming side walls of said ring to further deform the elongated clip.

3. A method as defined in claim 2, wherein said side walls are deformed to a sinuous path on said ring.

4. A method as defined in claim 1, wherein said clip is deformed transversely of said ring intermediate the ends thereof to deform the wire between the walls of said clip.

5. A method of making a brush which comprises attaching one end of a wire to a wheel having a V-shaped cross-section with the wire spaced from the base of said V, locating a plurality of brush elements intermediate the peripheral surface of said wheel and said wire, rotating said wheel while tensioning said wire to (1) force the medial portions of said brush elements into the base of said wheel and (2) wind a plurality of consecutive turns of wire over the medial portions of said brush elements, surrounding the last strand of wire with an elongated clip, detaching said one end of said wire and locating said end in the base of said V-shaped wheel overlying said medial portions of said brush elements and within said elongated clip, and deforming said clip transversely of said wheel to (1) attach said one end of said wire to said last strand and (2) lock said brush elements in the V-shaped portion of said wheel.

6. A method as defined in claim 5, wherein said deforming of said clip includes crimping said clip and transversely deforming the walls of said V-shaped wheel to indent portions of the walls causing the clip to deform transversely of said wheel.

References Cited

UNITED STATES PATENTS

| 1,059,858 | 4/1913 | Gardner | 15—181 |
| 1,637,823 | 8/1927 | Herold | 15—179 XR |
| 1,706,159 | 3/1929 | Herold | 15—181 |
| 2,349,644 | 5/1944 | Wesemeyer | 15—182 |
| 3,059,991 | 10/1962 | Munt | 15—159.1 |
| 3,109,190 | 11/1963 | Nelson | 15—181 |
| 3,137,020 | 6/1964 | Tilgner | 15—179 |

FOREIGN PATENTS 862,359 3/1961 Great Britain.

PETER FELDMAN, *Primary Examiner.*

U.S. Cl. X.R.

15—179, 182

UNITED STATES PATENT OFFICE

CERTIFICATE OF CORRECTION

Patent No. 3,442,555            Dated May 6, 1969

Robert E. Cook

It is certified that error appears in the above-identified patent and that said Letters Patent are hereby corrected as shown below:

Column 1, line 34 after "In" delete "a"; line 50 should read --the side walls. The clip and the formation of the sinuous--. Column 3, line 62 "fairly" should read --firmly--.

SIGNED AND
SEALED
FEB 24 1970

(SEAL)
Attest:

Edward M. Fletcher, Jr.
Attesting Officer

WILLIAM E. SCHUYLER, JR.
Commissioner of Patents